Patented June 15, 1954

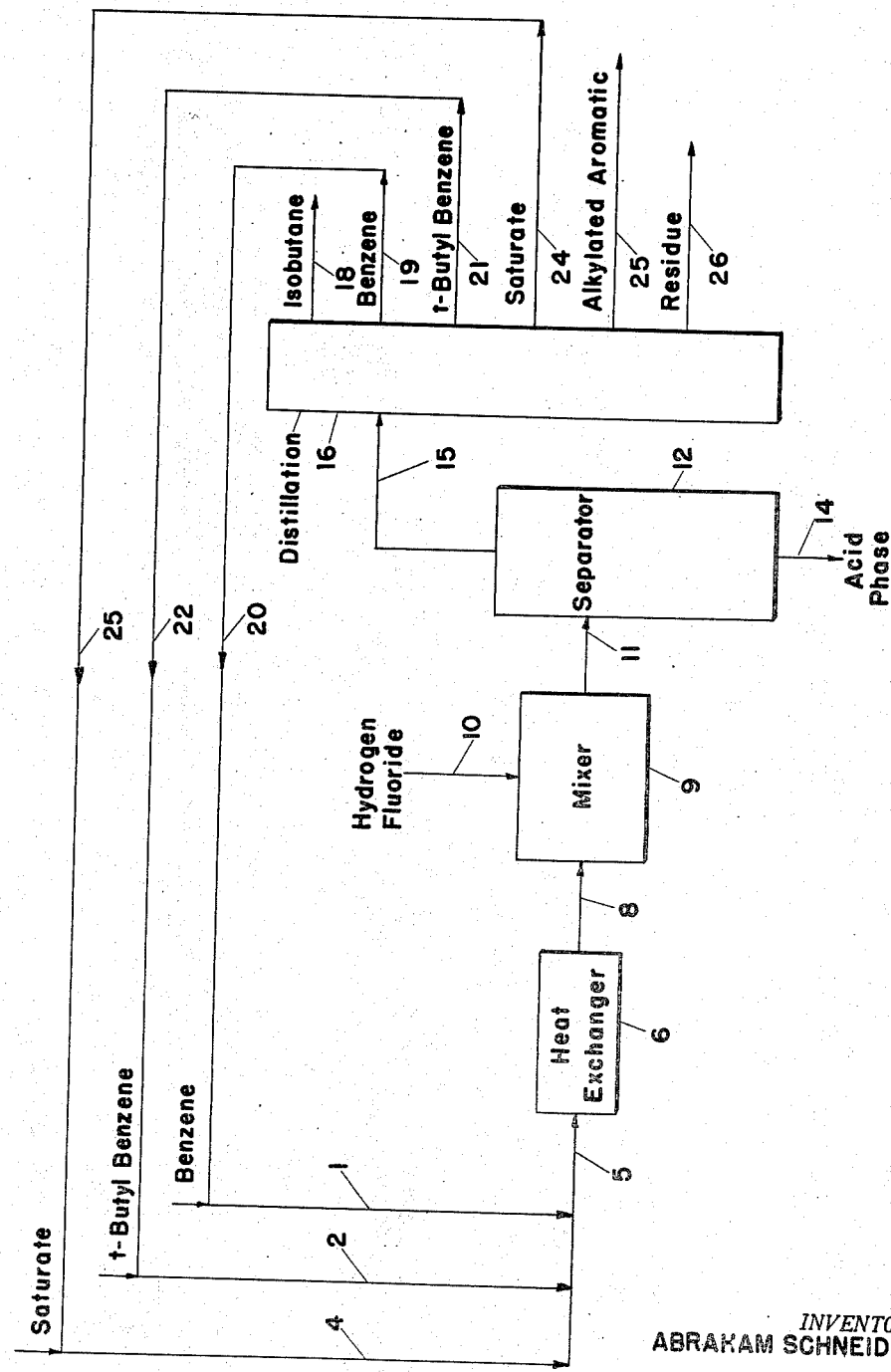

2,681,373

UNITED STATES PATENT OFFICE 2,681,373

CATALYTIC ALKYLATION OF AROMATIC HYDROCARBONS

Abraham Schneider, Philadelphia, Pa., assignor to Sun Oil Company, Philadelphia, Pa., a corporation of New Jersey Application June 2, 1949, Serial No. 96,755

1 Claim. (Cl. 260—668)

This invention relates to a catalytic alkylation process, and more particularly to the alkylation of aromatics with isoparaffins under novel catalytic conditions.

Aromatics have heretofore been alkylated with paraffins or naphthenes by what is known as the Friedel-Crafts reaction. This reaction, as is well known, involves a two-step process wherein the paraffin is chlorinated with chlorine gas, and the alkyl halide thus formed is joined to the aromatic compound by use of a metal halide, such as aluminum chloride. In this process, the chlorine is irreversibly converted to hydrogen chloride and as such presents a disposal problem; the metal halide catalyst is deactivated in the reaction, being converted to a complex form from which its regeneration is difficult and uneconomical.

It has now been discovered that alkylatable aromatics can be alkylated with isoparaffins which contain at least 1 tertiary hydrogen atom per molecule by subjecting a mixture of such isoparaffins and aromatics to the simultaneous action of hydrogen fluoride and a tertiary substituted aromatic. According to the invention, when hydrogen fluoride and a tertiary substituted aromatic are brought together in the presence of an alkylatable aromatic and a tertiary hydrogen-containing isoparaffin, a catalytic condition established which is effective to cause such isoparaffin to alkylate the aromatic. Thus, as hereinafter fully illustrated, the present invention provides a one-step process whereby aromatics are alkylated with isoparaffin to produce alkylated aromatics in good yields, and in which process the acid catalyst may be regenerated and recycled. A further advantage is that the present process can be conducted in the present conventional alkylation contactors, i. e., special apparatus is unnecessary.

The mechanism of the alkylation reaction is complicated, and is not completely understood. The overall reaction, however, may be expressed by the equation:

AH+RH+AT+HF=AR+HT+HF wherein AH represents an alkylatable aromatic, RH represents a tertiary hydrogen-containing isoparaffin, AT represents a tertiary substituted aromatic, AR represents the desired alkylated aromatic product, HT represents the isoparaffin corresponding to the tertiary alkyl group of the tertiary substituted aromatic AT, and HF represents hydrogen fluoride. It has been found that the isoparaffin corresponding to the tertiary group of the tertiary substituted aromatic catalytic component is always produced as a product in the present process, and is characteristic thereof. It is further characteristic of the present process that the alkyl radical attached to the aromatic nucleus of the desired alkylated aromatic product contains the same number of carbon atoms as did the tertiary hydrogen-containing isoparaffin. It is also characteristic of the present process that substantially no alkyl fluorides are formed, and practically all of the hydrogen fluoride employed is easily recoverable from the process, and may be recycled thereto.

In a preferred embodiment of the present invention, the tertiary substituted aromatic is selected so that the aromatic nucleus thereof is the same as that of the alkylatable aromatic. In this instance, the aromatic portion of the tertiary substituted aromatic, after cleavage of the substituent group, may be alkylated by the isoparaffin, and thus the formation of the desired product is enhanced. The alkylation of benzene using tertiary butyl benzene as a catalytic component is illustrative of this embodiment. In some instances, the aromatic portion of the tertiary substituted aromatic may furnish the entire amount of aromatic to be alkylated, but such procedure is not preferred. Where the aromatic nucleus of the tertiary substituted aromatic and the alkylatable aromatic are different, some alkylation of the aromatic portion of the tertiary substituted aromatic is observed, the amount of which may be held to insignificant quantities by employing a relatively large proportion of the alkylatable aromatic. The alkylation of naphthalene using tertiary butyl benzene as a catalytic component illustrates this latter phase of the invention.

In practicing the present invention, hydrogen fluoride and a tertiary substituted aromatic are contacted in the presence of the aromatic to be alkylated and the tertiary hydrogen-containing isoparaffin. The catalytic components, i. e., the hydrogen fluoride and the tertiary substituted aromatic, may be added to the reaction mixture simultaneously, or one component may be added, followed by the addition of the other component. It is important, however, that the bringing together of the catalytic components be accomplished in the presence of both the aromatic to be alkylated and the alkylating isoparaffin.

By the term "tertiary substituted aromatic," as used herein, is meant hydrocarbon compounds having a tertiary carbon atom of a substituent radical attached to a carbon atom contained in an aromatic ring, i. e., hydrocarbons wherein a carbon atom attached to three other carbon atoms is also attached to a carbon atom of an aromatic nucleus. By the term "saturate," and terms of similar import, as employed herein, is meant a dearomatized hydrocarbon fraction composed substantially of a mixture of branched chain paraffins, including naphthenes, which contain an average of at least 1 tertiary hydrogen atom per molecule, i. e., a hydrogen atom attached to a carbon atom, which carbon atom in turn is attached to 3 other carbon atoms, and by the term "isoparaffin," is meant a single such branched chain paraffin, this term being included in the broader term "saturate," unless otherwise stated.

The aromatics which may be employed in the process of the present invention are the alkylatable aromatics, i. e., those members of the aromatic series which have a substitutable position on the aromatic nucleus. Such aromatics include, for example, benzene, toluene, o-, m- and p-xylenes, mixtures of xylenes, ethylbenzene, naphthalene, alpha methyl naphthalene, beta methyl naphthalene, diphenyl, the aromatics contained in hydrocarbon fractions, especially those fractions which have been subjected to cracking, and the like. In general, however, the aromatic to be alkylated should not have more than four substituent groups on the aromatic nucleus. Saturates and isoparaffins which may be employed in the process of the present invention to alkylate the aromatics include, for example, substantially pure isoparaffins containing from 5 to about 30, and preferably from 5 to 20, carbon atoms per molecule, such as isopentane, 2-methyl decane, 3-butyl decane, branched chain hexadecanes, heptadecanes and the like, mixtures thereof, and hydrocarbon fractions containing a substantial proportion of such isoparaffins, alkyl naphthenes such as methyl- and ethylcyclohexane, and mixtures of such naphthenes and isoparaffins. Saturate petroleum fractions, such as dearomatized fractions from catalytic cracking, which contain a substantial proportion of the above and other isoolefins may advantageously be employed. Other hydrocarbons which may be present in such fractions serve as diluents and do not enter the reaction. Such saturate fractions should contain above about 25%, and preferably above 50%, isoparaffins of 5 to 30 carbon atoms having an average of at least one tertiary hydrogen atom per molecule. It is preferred to employ isoparaffins other than those wherein the carbon atom attached to the tertiary hydrogen atom is in the beta position relative to a quaternary carbon atom, since, as has been found, under the conditions of the present process, such isoparaffins do not give, to an appreciable extent, alkylated aromatics wherein the alkyl substituent contains the same number of carbon atoms as the isoparaffin.

Hydrocarbon fractions containing both alkylatable aromatics and tertiary hydrogen-containing saturates may be employed in the process of the present invention. By contacting a tertiary substituted aromatic with hydrogen fluoride in the presence of such a fraction, a catalytic condition is established whereby the saturates alkylate the aromatics. If desired, a further quantity of aromatics or saturates or both, may be added to the fraction to obtain the desired concentration of each. The added aromatics or saturates may be the same as those of the fraction, or different aromatics and saturates may be added and may be so selected that a desired product is obtained.

Tertiary substituted aromatics which may be employed in the present process have a tertiary carbon atom of a substituent radical attached to a carbon atom contained in an aromatic ring, and preferably the tertiary carbon-containing substituent is an isoalkyl radical, such as the tertiary butyl radical. Tertiary butyl benzene is the preferred tertiary substituted aromatic. As illustrative of other compounds which may be employed are: o-, m- and p-tertiary butyl toluene; the tertiary butyl xylenes; 2-phenyl-2-methylbutane; 2-phenyl-2-methylpentane; 3-phenyl-3-methylpentane; alpha tertiary butyl naphthalene; beta tertiary butyl naphthalene; 1,1-phenylmethyl cyclohexane; 2,2-diphenylpropane; 2-phenyl-2-cyclohexyl propane; similar tertiary substituted aromatic compounds, and derivatives thereof.

The quantities of reactants employed in the present process may be substantially varied and good results obtained therewith. Preferably from 0.2 moles to 6 moles of saturate is employed for each mole of aromatic, i. e., the mole ratio of saturate to aromatic is preferably from 1:5 to 6:1. It has been found that a large excess of aromatic, while not adversely affecting the process, does not aid in increasing the yield, either per pass or ultimate, the same being true of a large excess of isoparaffin or saturate. The quantity of tertiary substituted aromatic to employ may advantageously be from 0.1 to 1 mole for each mole of aromatics plus saturates, i. e., a mole ratio of tertiary substituted aromatic to aromatics plus isoparaffins of from 1:10 to 1:1, good results being obtained when about 0.4 to 0.6 moles of tertiary substituted aromatic for each mole of aromatics plus saturates is employed. It is advantageous to employ an excess of hydrogen fluoride, from about 1 to 8 moles, and preferably from 1 to 4 moles, for each mole of aromatic plus saturate giving good results. Anhydrous hydrogen fluoride gives good results, but hydrogen fluoride admixed with e. g., hydrocarbon oils or water, wherein the hydrogen fluoride content is above 90%, and preferably above 95%, may be employed.

In practicing the present invention, it is advantageous to maintain the temperature of alkylation within the range of from about 50° C. to 200° C., and preferably between 75° C. and 150° C. Below 50° C., the desired alkylation occurs only relatively slowly. At temperatures above 200° C. considerable disproportionation of the saturates, and cracking of the alkylated aromatic product, is observed. In general, temperatures of from 75° C. to 150° C. causes the desired alkylation reaction to progress rapidly, and substantial yields of the desired alkylated aromatic product are obtained. The pressure during alkylation should be sufficient to keep the reactants in the liquid phase. Using the preferred reactants and temperature range of the present invention, pressures of from 100 to 200 p. s. i. are preferred and give good results, although in some instances, lower or higher pressures may be employed.

The time required for the alkylation varies according to the temperature employed, the reactants and tertiary substituted aromatic employed, their concentrations, and the like, and is not considered a critical variable, it being obvious that sufficient time should be permitted to obtain the desired product in substantial yields. In general, an alkylation time of from 15 minutes to 2 hours attains the desired result, and when preferred reactants, catalyst, and conditions are employed, from 30 to 60 minutes is suitable.

In some instances a promoter such as boron fluoride may be employed to a good advantage. Thus, boron fluoride employed in the present process permits the desired reaction to occur at a lower temperature than otherwise required. However, excessive use of such a promoter, or of the simultaneous use of high temperature therewith, causes disproportionation of the saturates, and cleavage of the alkylated aromatic product, and hence when employing such a promoter, only a minor proportion may be employed and a relatively low temperature should be used. Preferably not more than 8% by weight, based on the total weight of the reaction mixture, is employed, and generally the quantity of boron fluoride employed should be from about 0.5% to 4% by weight.

The accompanying drawing is a diagrammatic flow sheet illustrating a preferred embodiment of the present invention. Referring to the flow sheet, benzene and tertiary butyl benzene, employed to illustrate the present invention, are introduced into the system through lines 1 and 2 respectively, and the saturate is introduced through line 4. As hereinbefore described, the saturate should contain a large proportion of isoparaffins containing an average of at least 1 tertiary hydrogen atom per molecule. These components are passed through line 5 into heat exchanger 6, which may be a cooler or a heater, depending on the desired temperature of alkylation. From the heat exchanger, the mixture is passed through line 8 into mixer 9, which is equipped with an agitator and, if desired or necessary, means (not shown) for supplying additional heat to the reaction mixture. Hydrogen fluoride is introduced into the mixer through line 10. If desired, the points of introduction of hydrogen fluoride and tertiary butyl benzene may be reversed, or both of these catalytic components may be introduced simultaneously but separately into mixer 9, and substantially identical results obtained thereby. From the mixer the reaction mixture passes through line 11 into separator 12 where the phases are allowed to separate. The acid phase is removed through line 14. Hydrogen fluoride may be regenerated from this phase, e. g., by distillation (by means not shown), and recycled to the process. The hydrocarbon phase is passed from separator 12, through line 15, into distillation zone 16. The distillation zone may advantageously consist of a plurality of such zones. It is characteristic of the present process that a substantial portion of the tertiary carbon-containing substituent of the tertiary substituted aromatic is converted to the corresponding paraffin. Thus, in the present specific embodiment, some isobutane is obtained and may be removed from the system through line 18. Benzene may be removed through line 19 and recycled to the process through line 20. Any unreacted tertiary butyl benzene is removed through line 21, and may be recycled to the process through line 22. Unreacted saturates may be removed through line 24 and recycled through the process through line 25. The desired alkylated aromatic product is recovered through line 25, and any higher boiling residue removed through line 26.

The following examples illustrate preferred embodiments of the present invention, which is not to be considered as limited thereby:

Example 1

A contactor provided with a stirrer was charged with 40 g. of t-butylbenzene, 117 g. of methyl cyclohexane and 90 g. of hydrogen fluoride. The reaction mixture was stirred at 25° C. for 90 minutes and at 60° C. for 30 minutes, after which it was transferred to a copper vessel cooled to −78° C., and the components thereof separated by decantation and distillation. Results are summarized below:

Components recovered:
- Isobutane _____ g__ 9
- Benzene _____ g__ 7
- t-Butylbenzene _____ g__ 6.9
- Methylcyclohexane _____ g__ 82
- High boiling residue_____ g__ 3

Desired alkylated product [1]_____ g__ 24

Yield, mole percent (based on aromatics reacted) _____ 86

Yield, mole percent (based on saturate reacted) _____ 39

Yield, mole percent (based on moles isobutane formed) _____ 89

Wt. percent total charge recovered_____ 89

[1] Composed largely of secondary methylcyclohexylbenzenes.

Example 2

The procedure of Example 1 was substantially duplicated, except that in place of methylcyclohexane there was employed as the saturate a dearomatized saturate fraction of second-pass catalytic gas-oil having an average molecular weight of 222, $n_D^{20}=1.4483$, and containing 70.8% isoparaffins and 26.2% paraffins containing a naphthene ring, the remainder being olefins and aromatics. In run B a quantity of benzene, in addition to the quantity contained in the t-butylbenzene, was added to the charge. Operational variables and results are summarized below:

| | Run A | Run B |
|---|---|---|
| Reaction temperature, ° C | 100 | 100 |
| Reaction time, minutes | 90 | 150 |
| Charge: | | |
| t-butylbenzene, g | 40 | 76 |
| benzene, g | | 150 |
| saturate, g | 125 | 151 |
| hydrogen fluoride, g | 93 | 116 |
| Desired alkylated product, g | 12 | 46 |
| Yield, mole percent (based on saturate consumed) | 39 | 57 |
| Components recovered: | | |
| benzene, g | 9.7 | 144.5 |
| t-butylbenzene, g | 1.7 | 18 |
| di-t-butylbenzene, g | 8 | 0 |
| saturates, g | 95 | 90 |
| high boiling residue, g | 4.5 | 5 |

Example 3

The procedure of Example 1 was substantially duplicated, a small quantity of $BF_3$ being added to the reaction mixture as an accelerator. The saturate employed in Example 2 was used. Three runs were performed at different temperatures. Operational variables and results obtained were as follows:

| | Run A | Run B | Run C |
|---|---|---|---|
| Reaction temperature, ° C | 25 | 55–65 | 100 |
| Reaction time, hours | 3 | 2.75 | 2 |
| Charge: | | | |
| benzene, g | 150 | 150 | 150 |
| t-butylbenzene, g | 80 | 80 | 80 |
| saturate, g | 150 | 150 | 149 |
| hydrogen fluoride, g | 116 | 116 | 132 |
| boron trifluoride, g | 16 | 15 | 12.5 |
| Desired alkylated product, g | 29 | 34.5 | 18 |
| Yield, mole percent (based on saturate reacted) | 53 | 44 | 22 |
| Components recovered: | | | |
| isobutane, g | 6.2 | 26.6 | 26 |
| benzene, g | 142 | 143 | 151 |
| t-butylbenzene, g | 49.1 | 6.1 | 7 |
| di-t-butylbenzene, g | 4.4 | 0 | 8 |
| saturate, g | 109.6 | 91.6 | 89 |
| high boiling residue, g | 7 | 5.5 | 10 |
| Wt. percent total charge recovered | 93 | 94 | 93.8 |

The foregoing examples illustrate preferred embodiments of the present invention. The use of other tertiary substituted aromatics, and the use of other alkylatable aromatics, as hereinbefore described, give results comparable to those set forth by the examples. The process of the present invention may be carried out by batch, intermittent, or continuous processes.

The lower molecular weight alkyl-aromatic products prepared in accordance with the present invention are variable components of fuel compositions, and the higher molecular weight products may be employed in the preparation of detergents, and as additives for lubricating and cutting oils.

I claim:

An alkylation process which comprises bringing together, in the liquid phase at a temperature of from 50° C. to 200° C., hydrogen fluoride and tertiary butyl benzene in the presence of methylcyclohexane, and recovering methylcyclohexylbenzene from the reaction mixture.

References Cited in the file of this patent

UNITED STATES PATENTS

| Number | Name | Date |
|---|---|---|
| 2,225,543 | Amos | Dec. 17, 1940 |
| 2,234,984 | Sachanen et al. | Mar. 18, 1941 |
| 2,349,211 | Tulleners | May 16, 1944 |
| 2,408,753 | Burk | Oct. 8, 1946 |
| 2,413,161 | Zerner et al. | Dec. 24, 1946 |
| 2,433,020 | Becker | Dec. 23, 1947 |
| 2,456,119 | Friedman et al. | Dec. 14, 1948 |
| 2,456,435 | Matuszak | Dec. 14, 1948 |
| 2,456,672 | Bloch et al. | Dec. 21, 1948 |
| 2,459,636 | Fenney | Jan. 18, 1949 |